US00RE47567E

(19) United States
(12) Reissued Patent
Kato et al.

(10) Patent Number: US RE47,567 E
(45) Date of Reissued Patent: Aug. 6, 2019

(54) ON-VEHICLE REMOTE CONTROL APPARATUS AND METHOD FOR CONTROLLING REMOTELY CONTROLLABLE ON-VEHICLE DEVICE

(71) Applicant: HONDA MOTOR CO., LTD., Tokyo (JP)

(72) Inventors: Hisato Kato, Saitama (JP); Nobuaki Asahara, Saitama (JP)

(73) Assignee: HONDA MOTOR CO., LTD., Tokyo (JP)

(21) Appl. No.: 15/676,458

(22) Filed: Aug. 14, 2017

Related U.S. Patent Documents

Reissue of:
(64) Patent No.: 8,565,936
Issued: Oct. 22, 2013
Appl. No.: 13/105,895
Filed: May 12, 2011

(30) Foreign Application Priority Data

Jun. 21, 2010 (JP) ..... 2010-140491

(51) Int. Cl.
*G06F 7/00* (2006.01)
*H04M 3/51* (2006.01)
(Continued)

(52) U.S. Cl.
CPC ..... *H04M 3/5116* (2013.01); *G07C 5/008* (2013.01); *G08C 17/00* (2013.01); *H04M 11/04* (2013.01)

(58) Field of Classification Search
CPC .. G05D 1/0088; H04M 3/5116; H04M 11/04; G08C 17/00; G07C 5/008
See application file for complete search history.

(56) References Cited

U.S. PATENT DOCUMENTS

2002/0123833 A1* 9/2002 Sakurai ..... G07C 5/008 701/31.4
2006/0238316 A1* 10/2006 Taki ..... B60R 25/2036 340/426.13
2008/0172147 A1* 7/2008 Taki ..... B60R 25/2018 701/2

FOREIGN PATENT DOCUMENTS

CN 1993720 A 7/2007
JP 2000-155887 6/2000
(Continued)

OTHER PUBLICATIONS

Japanese Office Action for corresponding JP Application No. 2010-140491, dated Apr. 17, 2012.
(Continued)

*Primary Examiner* — Nick Corsaro
(74) *Attorney, Agent, or Firm* — Drinker Biddle & Reath LLP

(57) ABSTRACT

An on-vehicle remote control apparatus includes a use-state determining device configured to determine whether a vehicle is in use. The vehicle has a remotely controllable on-vehicle device. An emergency-mode determining device is configured to determine whether the vehicle is in an emergency mode. A remote-control-execution determining device is configured to determine whether a remote-control executing device is permitted to execute remote control of the on-vehicle device. If the use-state determining device determines that the vehicle is in use, the remote-control-execution determining device prohibits the remote-control executing device from executing the remote control of the
(Continued)

on-vehicle device. Even when the use-state determining device determines that the vehicle is in use, if the emergency-mode determining device determines that the vehicle is in the emergency mode, the remote-control-execution determining device permits the remote-control executing device to execute the remote control of the on-vehicle device.

17 Claims, 6 Drawing Sheets

(51) Int. Cl.

| | |
|---|---|
| ***G07C 5/00*** | (2006.01) |
| ***G08C 17/00*** | (2006.01) |
| *H04M 11/04* | (2006.01) |

(56) References Cited

FOREIGN PATENT DOCUMENTS

| | | | |
|---|---|---|---|
| JP | 2000-155887 | A | 6/2000 |
| JP | 2004-224067 | | 8/2004 |
| JP | 2004-224067 | A | 8/2004 |
| JP | 2006-195580 | | 7/2006 |
| JP | 2006-195580 | A | 7/2006 |
| JP | 2006-347334 | | 12/2006 |
| JP | 2006-347334 | A | 12/2006 |
| WO | WO 2006/075489 | A1 | 7/2006 |

OTHER PUBLICATIONS

Japanese Decision to grant a patent for corresponding JP Application No. 2010-140491, dated Jul. 24, 2012.

First Notification of Reasons for Refusal, dated Jul. 17, 2013, Patent Application No. 201110079004.X, State Intellectual Property Office of the People's Republic of China, with English-language translation.

Second Notification of Reasons for Refusal, dated Jan. 13, 2014, Patent Application No. 201110079004.X, State Intellectual Property Office of the People's Republic of China, with English-language translation.

* cited by examiner

ON-VEHICLE REMOTE CONTROL APPARATUS AND METHOD FOR CONTROLLING REMOTELY CONTROLLABLE ON-VEHICLE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application *is a reissue of U.S. Pat. No. 8,565,936, which* claims priority under 35 U.S.C. §119 to Japanese Patent Application No. 2010-140491, filed Jun. 21, 2010, entitled "On-vehicle Remote Control Apparatus". The contents of this application are incorporated herein by reference in their entirety.

BACKGROUND OF THE INVENTION

1. Field of the Invention

The present invention relates to an on-vehicle remote control apparatus and a method for controlling a remotely controllable on-vehicle device.

2. Description of the Related Art

Vehicles having a so-called remotely controllable on-vehicle device have been proposed. Such a vehicle allows remote control of an on-vehicle device from a location away from the vehicle with a mobile phone or the like through a mobile communication network (see, e.g., paragraphs [0002], [0024], [0043], and [0044] of Japanese Unexamined Patent Application Publication No. 2006-347334).

Japanese Unexamined Patent Application Publication No. 2006-347334 describes a technique in which, in a vehicle having a remotely controllable on-vehicle device, remote control of the on-vehicle device is permitted if the vehicle is determined not to be in operation (e.g., the vehicle is parked at a predetermined parking place), but remote control is not permitted if the vehicle is in operation.

SUMMARY OF THE INVENTION

According to one aspect of the present invention, an on-vehicle remote control apparatus includes a receiver, a remote-control executing device, a use-state determining device, an emergency-mode determining device, and a remote-control-execution determining device. The receiver is to receive a remote-control request signal transmitted from outside a vehicle having a remotely controllable on-vehicle device. The remote-control executing device is configured to execute remote control of the on-vehicle device when the receiver receives the remote-control request signal. The use-state determining device is configured to determine whether the vehicle is in use. The emergency-mode determining device is configured to determine whether the vehicle is in an emergency mode. The remote-control-execution determining device is configured to determine whether the remote-control executing device is permitted to execute the remote control of the on-vehicle device. If the use-state determining device determines that the vehicle is in use, the remote-control-execution determining device prohibits the remote-control executing device from executing the remote control of the on-vehicle device. Even when the use-state determining device determines that the vehicle is in use, if the emergency-mode determining device determines that the vehicle is in the emergency mode, the remote-control-execution determining device permits the remote-control executing device to execute the remote control of the on-vehicle device.

According to another aspect of the present invention, a method for controlling a remotely controllable on-vehicle device includes receiving a remote-control request signal transmitted from outside a vehicle having the on-vehicle device. Remote control of the on-vehicle device is executed when the remote-control request signal is received. The remote control of the on-vehicle device is prohibited if it is determined that the vehicle is in use. The remote control of the on-vehicle device is permitted if it is determined that the vehicle is in the emergency mode even when it is determined that the vehicle is in use.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
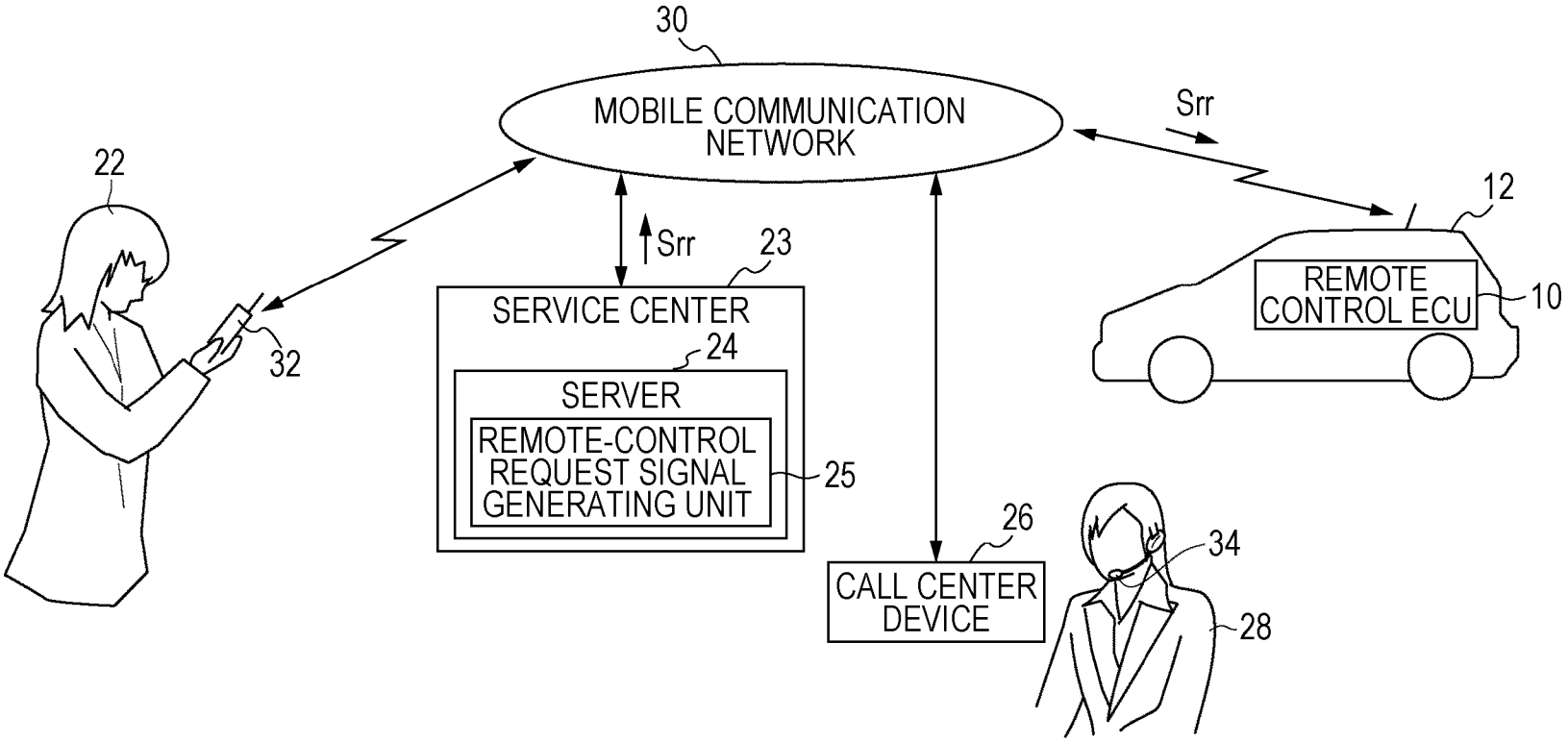
FIG. 1 is a schematic configuration diagram illustrating a vehicle remote control system for emergencies to which an on-vehicle remote control device according to an embodiment of the present invention is applied.

The embodiments of the present invention will now be described with reference to the attached drawings, wherein like reference numerals designate corresponding or identical elements throughout the various drawings.

FIG. 1 illustrates a configuration of a vehicle remote control system 20 for emergencies. The vehicle remote control system 20 includes a vehicle 12 on which the on-vehicle remote control device of the present embodiment is mounted in the form of a remote control electronic control unit (ECU) 10.

In the present embodiment, each of ECUs including the remote control ECU 10 (described below) is a calculator, such as a microcomputer. Each ECU includes a central processing unit (CPU), a read-only memory (ROM) (e.g., an electrically erasable programmable ROM (EEPROM)), a random-access memory (RAM), input/output units such as an analog-to-digital (A/D) converter and a digital-to-analog (D/A) converter, and a timer serving as a timepiece. When the CPU reads and executes a program recorded in the ROM, the ECU functions as various function realizing units, such as a controller, an arithmetic unit, and a processor.

As illustrated in FIG. 1, the vehicle remote control system 20 for emergencies includes a user 22, a server 24, a service center 23 having the server 24, a call center device 26, an operator 28 operating the call center device 26, the vehicle 12 having the remote control ECU 10, and a mobile communication network 30. The server 24 includes a remote-control request signal generating unit 25 described below. The call center device 26 may be located in the service center 23. The server 24 may be at a location different from the service center 23.

The mobile communication network 30 includes, for example, a mobile-phone communication network where base stations and mobile stations wirelessly communicate with each other and base stations communicate with each other via cables, and a satellite-phone communication network using satellites.

The user 22 is, for example, a driver of the vehicle 12 and carries a mobile information terminal 32, such as a mobile phone or a personal digital assistant (PDA).

The call center device 26 serves both as an information communication device and a terminal of the operator 28. The call center device 26 is operated by the operator 28 wearing a headset 34.

The mobile communication network 30 relays data, such as emails or voice, among the mobile information terminal 32, the server 24 for the service center 23, the call center device 26, the headset 34, and the remote control ECU 10.

Communication protocols used in the present embodiment are, for example, a hypertext transfer protocol (HTTP) for transmission of data including emails, and a short message service (SMS) protocol for transmission of short text messages.

The operator 28 can talk to the user 22 by voice with the headset 34 through the mobile communication network 30 and the mobile information terminal 32 while viewing information displayed on a display of the call center device 26. At the same time, the operator 28 can communicate with the server 24 for the service center 23 through the call center device 26 and the mobile communication network 30.

In accordance with a remote control request from the operator 28 operating the call center device 26 or from the user 22 operating the mobile information terminal 32, the server 24 generates a remote-control request signal Srr for remotely controlling an on-vehicle device of the vehicle 12. The server 24 then transmits the generated remote-control request signal Srr through the service center 23 and the mobile communication network 30 to the vehicle 12.

Figure 2:
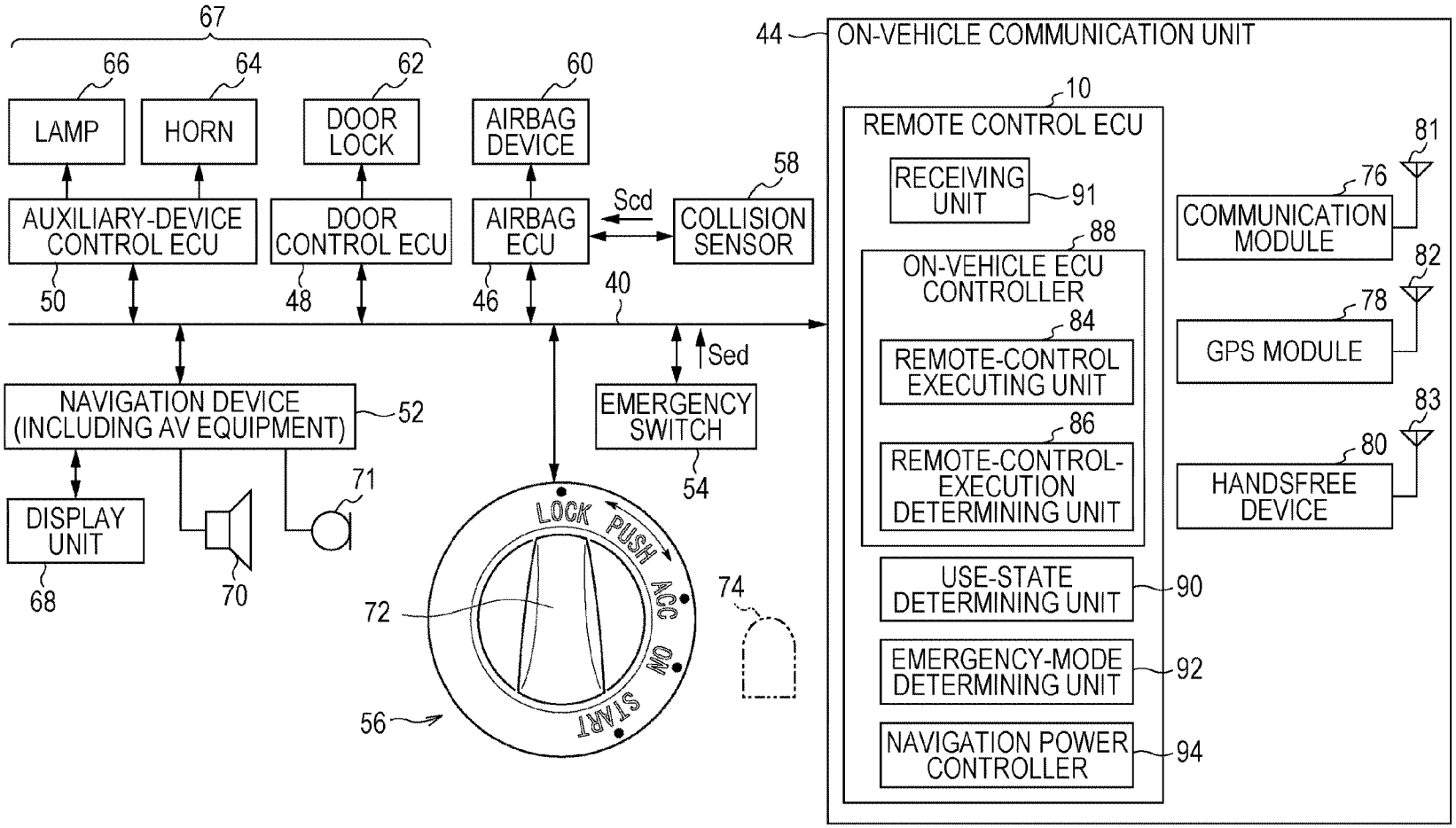
FIG. 2 is a block diagram illustrating a configuration of an electric circuit of a vehicle having the on-vehicle remote control device.

FIG. 2 illustrates a configuration of an electric circuit of the vehicle 12 having the remote control ECU 10.

The vehicle 12 has a communication line (on-vehicle network) 40, to which an on-vehicle communication unit 44, an airbag ECU 46, a door control ECU 48, an auxiliary-device control ECU 50, a navigation device 52, an emergency switch 54, and a knob-type ignition switch 56 are connected.

A collision sensor 58 and an airbag device 60 are connected to the airbag ECU 46. The collision sensor 58 is a sensor, such as an acceleration sensor, that detects a collision of the vehicle 12. The airbag device 60 includes an airbag that is inflated in response to a collision detection signal Scd from the collision sensor 58, and an inflator that inflates the airbag.

A door lock 62 is connected to the door control ECU 48, which controls locking and unlocking of the door lock 62.

A horn (sound generator) 64 and a lamp (lighting unit) 66 are connected to the auxiliary-device control ECU 50. The lamp 66 includes headlights, front position lights, taillights, interior lights, and turn signals.

The navigation device 52 includes audio visual (AV) equipment. The navigation device 52 is connected to a display unit 68 such as a liquid crystal display, a speaker (sound generator) 70, and a microphone 71.

In the present embodiment, the door lock 62, the horn 64, and the lamp 66 constitute an on-vehicle device 67 which is remotely controllable from outside the vehicle 12 through the mobile communication network 30 in case of emergency.

The emergency switch 54 is attached to a roof part close to an area where a rearview mirror is mounted. An occupant of the vehicle 12 can press the emergency switch 54 in case of emergency. The emergency switch 54 outputs an emergency detection signal (emergency-switch press signal) Sed when pressed.

The knob-type ignition switch 56 allows an occupant (e.g., driver) having a portable device (card) 74 in a smart card system to push a knob 72 at a LOCK position, turn the knob 72 between the LOCK position and an "accessory on" (ACC) position while holding it down, turn the knob 72 between the ACC position and an "ignition on" (ON) position, and turn the knob 72 from the ON position to an "engine start" (START) position. The START position can be referred to as a momentary position, because when the knob 72 is released at the START position, the knob 72 is returned to the ON position by spring force.

That is, the knob 72 is first pushed at the LOCK position and turned from the LOCK position to the ACC position while being held down (as indicated by PUSH). The knob 72 can be turned to the ACC position when authentication between an on-vehicle device (not shown) and the portable device 74 is successful and a knob lock (not shown) is released. When the knob 72 is turned to the ACC position, accessories, such as a radio and an audio device, are enabled. Then, the knob 72 can be turned from the ACC position to the ON position for turning on the ignition. The knob 72 is located at the ON position while the vehicle 12 is in operation. The knob 72 can be further turned from the ON position to the START position for engine start. Detection signals corresponding to the knob pushing operation, the LOCK position, the ACC position, the ON position, and the START position are supplied from the knob-type ignition switch 56 through the communication line 40 to the on-vehicle communication unit 44 etc.

In addition to the remote control ECU 10 described above, the on-vehicle communication unit 44 includes a communication module 76, a global positioning system (GPS) module 78, and a handsfree device 80 equipped with antennas 81, 82, and 83, respectively.

The antenna 81 for the communication module 76 is an antenna for connecting to the mobile communication network 30. The antenna 82 for the GPS module 78 is an antenna for receiving radio waves from a GPS satellite. The antenna 83 for the handsfree device 80 is an antenna for Bluetooth (registered trademark) which allows short-range connection to the mobile information terminal 32 (e.g., mobile phone) owned by an occupant of the vehicle 12.

As function realizing units that function when the CPU of the remote control ECU 10 reads and executes a program, the remote control ECU 10 includes a receiving unit 91, an on-vehicle ECU controller 88 having a remote-control executing unit 84 and a remote-control-execution determining unit 86, a use-state determining unit 90, an emergency-mode determining unit 92, and a navigation power controller 94.

The receiving unit 91 receives the remote-control request signal Srr (see FIG. 1) transmitted from outside the vehicle 12 and received through the antenna 81 and the communication module 76.

When the receiving unit 91 receives the remote-control request signal Srr, the remote-control executing unit 84 performs a predetermined remote control operation on the corresponding on-vehicle device 67.

The use-state determining unit 90 determines whether the vehicle 12 is in use. If the knob 72 of the knob-type ignition switch 56 is at the ACC position or the ON position, the use-state determining unit 90 determines that the vehicle 12 is in use.

The emergency-mode determining unit 92 determines whether the vehicle 12 is in emergency mode. If the collision detection signal Scd is input from the collision sensor 58 through the airbag ECU 46 and the communication line 40 or if the emergency detection signal Sed is input from the emergency switch 54 through the communication line 40, the emergency-mode determining unit 92 determines that the vehicle 12 is in emergency mode.

The remote-control-execution determining unit 86 determines whether to permit the remote-control executing unit 84 to execute remote control of the on-vehicle device 67.

If the use-state determining unit 90 determines that the vehicle 12 is in use, the remote-control-execution determining unit 86 does not permit the remote-control executing unit 84 to execute remote control of the on-vehicle device 67. Even when the vehicle 12 is determined to be in use, if the emergency-mode determining unit 92 determines that the vehicle 12 is in emergency mode, the remote-control-execution determining unit 86 permits the remote-control executing unit 84 to execute remote control of the on-vehicle device 67.

Figure 3:
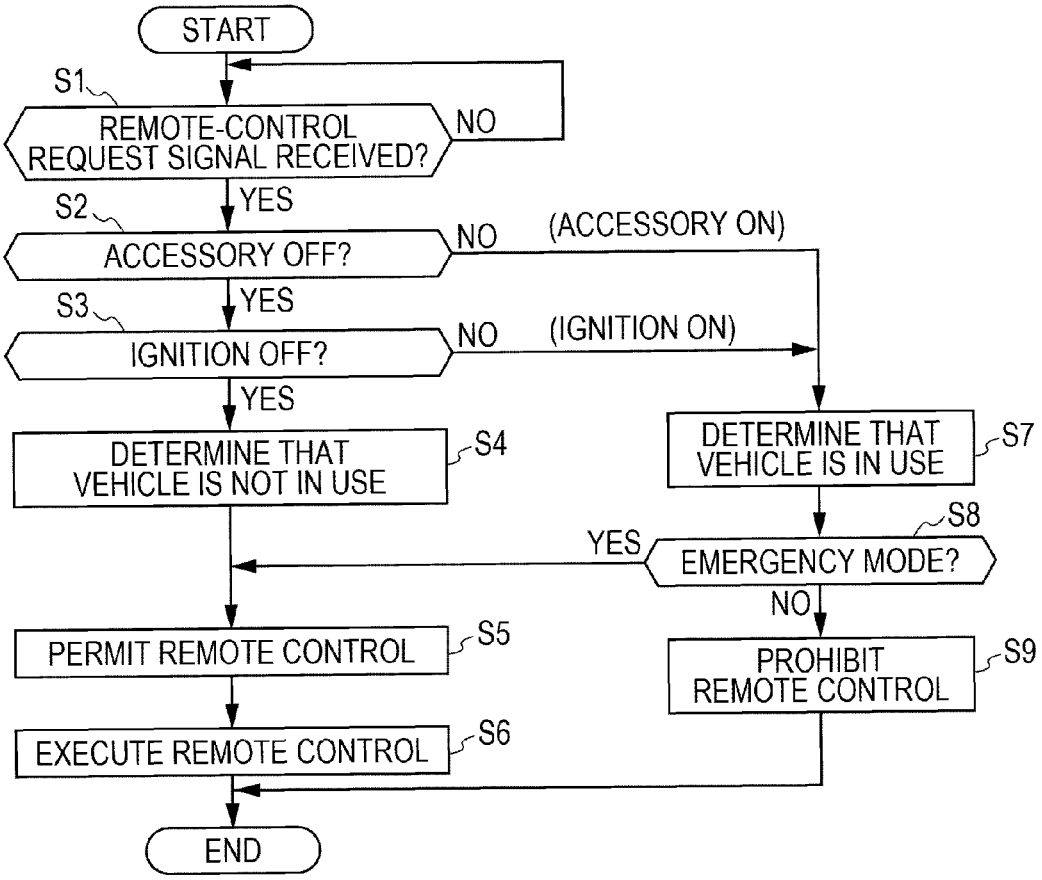
FIG. 3 is a flowchart for explaining an operation of the on-vehicle remote control device.

An operation of the above embodiment will now be described with reference to FIG. 3. FIG. 3 is a flowchart applicable to the remote control ECU 10.

In step S1, the receiving unit 91 of the remote control ECU 10 in the on-vehicle communication unit 44 mounted on the vehicle 12 determines whether the remote-control request signal Srr has been received from outside, particularly from the remote-control request signal generating unit 25 of the server 24, through the antenna 81 and the communication module 76.

The remote-control request signal Srr may represent, for example, an unlocking request for unlocking the door lock 62 or a car finder request for blinking the lamp 66 and sounding the horn 64.

If the receiving unit 91 has received the remote-control request signal Srr (YES in step S1), the process proceeds to step S2. In step S2, on the basis of the position indicated by the knob 72 of the knob-type ignition switch 56, the use-state determining unit 90 of the vehicle 12 determines whether the knob-type ignition switch 56 is at an "accessory off" position, and then in step S3, the use-state determining unit 90 determines whether the knob-type ignition switch 56 is at an "ignition off" position.

If the knob-type ignition switch 56 is at the "accessory off" position (YES in step S2) and at the "ignition off" position (YES in step S3), in other words, if the knob-type ignition switch 56 is at the LOCK position, the use-state determining unit 90 determines in step S4 that the vehicle 12 is not in use (i.e., the vehicle 12 is not moving).

If the vehicle 12 is determined not to be in use, the process proceeds to step S5, where the remote-control-execution determining unit 86 determines to permit execution of remote control.

If execution of remote control is permitted, the remote-control executing unit 84 executes, in step S6, remote control corresponding to an operation indicated by the remote-control request signal Srr received in step S1. That is, in step S6, the remote-control executing unit 84 executes remote control corresponding to an operation of the on-vehicle device 67 to be remotely controlled from outside.

Figure 4:
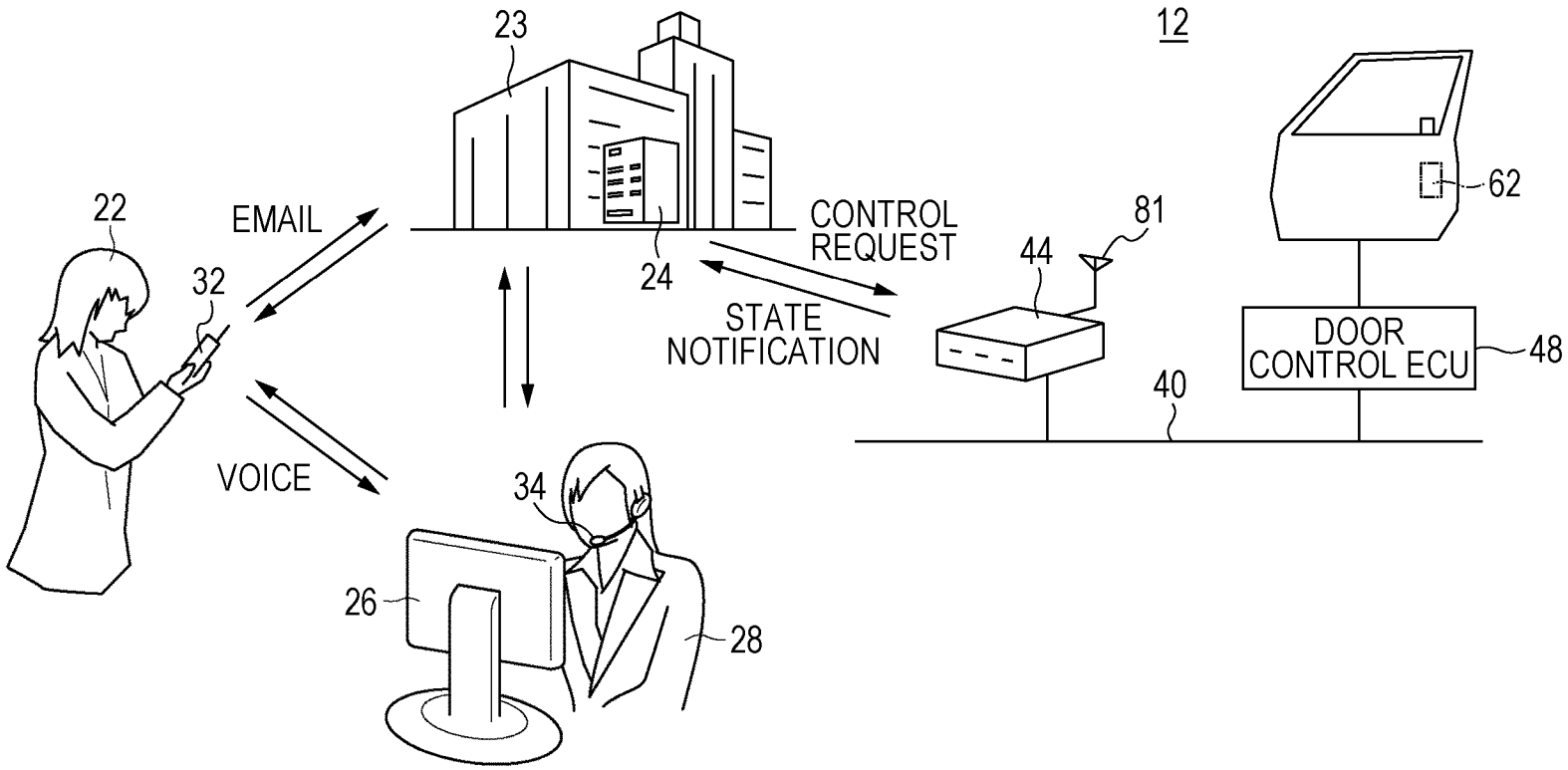
FIG. 4 illustrates an operation of remote door-locking control.

With reference to FIG. 4, a description will now be given of an overall operation carried out when a request represented by the remote-control request signal Srr received in step S1 is a door locking request. When the user 22 sends an email from the mobile information terminal 32 to the service center 23 to request remote control of the door lock, the remote-control request signal generating unit 25 of the server 24 in the service center 23 transmits the remote-control request signal Srr for door locking control to the vehicle 12 as a control request.

When the receiving unit 91 in the on-vehicle communication unit 44 of the vehicle 12 receives the remote-control request signal Srr for door locking control through the antenna 81 and the on-vehicle communication unit 44 (YES in step S1), if the process proceeds from step S2 to step S3, step S4 (the vehicle 12 is not in use), step S5 (remote control is permitted), and then to step S6, the remote-control request signal Srr for door locking control is transmitted through the remote-control executing unit 84 and the communication line 40 to the door control ECU 48, which receives the remote-control request signal Srr. Thus, the door lock 62 is locked.

When a door switch (not shown) or the like indicates that the door lock 62 has been locked, a notification indicating that the door has been locked is transmitted through the door control ECU 48 and the communication line 40 to the on-vehicle communication unit 44.

The on-vehicle communication unit 44 sends a state notification to the server 24 in the service center 23 to notify the server 24 that the door has been locked. Upon receipt of the state notification, the server 24 generates an email indicating that the door has been locked. The server 24 then transmits the generated email through the service center 23 to the mobile information terminal 32 of the user 22 who has sent the above-described email to request remote control of the door lock 62.

Upon receipt of the transmitted email, the user 22 can confirm, from outside (remote location), that the door of the vehicle 12 has been locked.

If the user 22 sends a door locking request through the call center device 26 to the operator 28 by voice instead of email, the operator 28 sends a control request through the call center device 26 to the service center 23 and the server 24. When the door is locked in the manner described above, the state notification is transmitted through the server 24 to the call center device 26.

Upon receipt of the state notification, the operator 28 calls the mobile information terminal 32 to tell the user 22 that the door has been locked.

Figure 5:
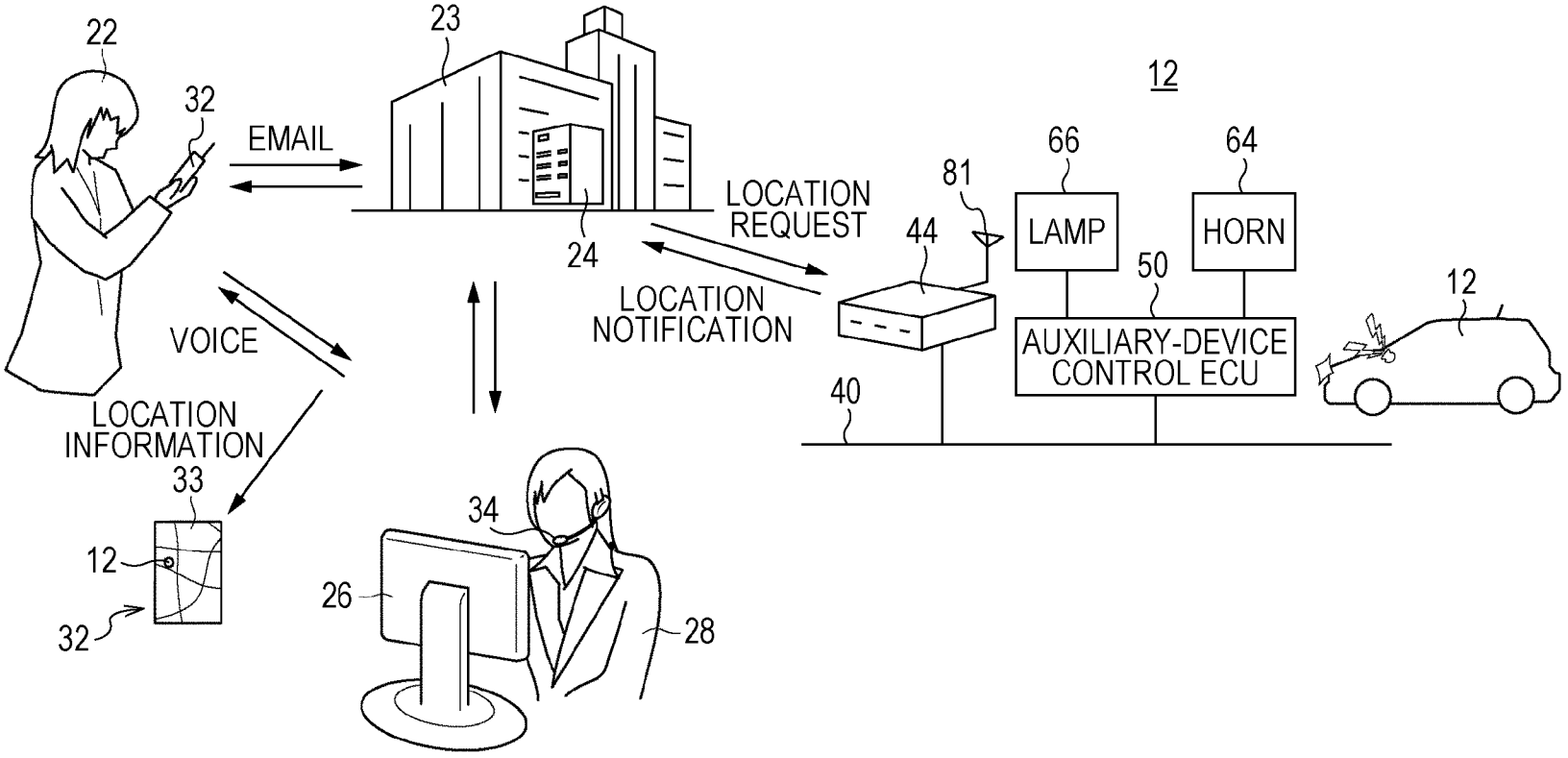
FIG. 5 illustrates an operation of remote car-finder control.

As another example, with reference to FIG. 5, a description will be given of an overall operation carried out when a request represented by the remote-control request signal Srr received in step S1 is a car finder request. When the user 22 sends an email from the mobile information terminal 32 to the service center 23 to request remote control of the car finder, the remote-control request signal generating unit 25 of the server 24 transmits the remote-control request signal Srr for the car finder to the vehicle 12 as a location request (control request).

When the receiving unit 91 in the on-vehicle communication unit 44 of the vehicle 12 receives the remote-control request signal Srr for the car finder (YES in step S1), if the process proceeds from step S2 to step S3, step S4 (the vehicle 12 is not in use), step S5 (remote control is permitted), and then to step S6, the remote-control request signal Srr for the car finder is transmitted through the remote-control executing unit 84 and the communication line 40 to the auxiliary-device control ECU 50, which receives the remote-control request signal Srr. Upon receipt of the remote-control request signal Srr, the auxiliary-device control ECU 50 blinks the lamp 66 and sounds the horn 64 as schematically illustrated in FIG. 5. The car finder function is thus executed.

When the navigation power controller 94 of the on-vehicle communication unit 44 activates or turns on the navigation device 52, the remote control ECU 10 can obtain location information indicating the location of the vehicle 12 from the navigation device 52 connected to the GPS module 78. Then, the navigation device 52 is turned off. The remote control ECU 10 may transmit the obtained location information of the vehicle 12 from the on-vehicle communication unit 44, through the service center 23 and the server 24, to the mobile information terminal 32 of the user 22 so as to display the location of the vehicle 12 on a map displayed on a screen 33 of the mobile information terminal 32.

If the user 22 makes a request by voice for remote control of the car finder from the mobile information terminal 32 to the operator 28 of the call center device 26, the corresponding vehicle 12 can be remotely controlled. Then, the operator 28 calls the user 22 to inform the user 22, by voice, of the location information of the vehicle 12.

Referring back to the flowchart of FIG. 3, when the remote-control request signal Srr is received (YES in step S1), if the knob-type ignition switch 56 is at the "accessory on" position (NO in step S2) or at the "ignition on" position (NO in step S3), the use-state determining unit 90 determines in step S7 that the vehicle 12 is in use.

If the vehicle 12 is determined to be in use, the emergency-mode determining unit 92 determines in step S8 whether the vehicle 12 is in emergency mode.

The determination as to whether the vehicle 12 is in emergency mode is made, as described above, by determining whether the collision detection signal Scd or the emergency detection signal Sed has been input to the emergency-mode determining unit 92.

If neither the collision detection signal Scd nor the emergency detection signal Sed has been input, the emergency-mode determining unit 92 determines that the vehicle 12 is not in emergency mode (NO in step S8). Then, the process proceeds to step S9, where the remote-control executing unit 84 is not permitted to execute remote control of the on-vehicle device 67 in response to receipt of the remote-control request signal Srr.

On the other hand, if the collision detection signal Scd or the emergency detection signal Sed has been input to the emergency-mode determining unit 92, the emergency-mode determining unit 92 determines that the vehicle 12 is in emergency mode (YES in step S8).

In this case, the process proceeds to step S5, where the remote-control-execution determining unit 86 permits the remote-control executing unit 84 to execute remote control of the on-vehicle device 67.

Figure 6:
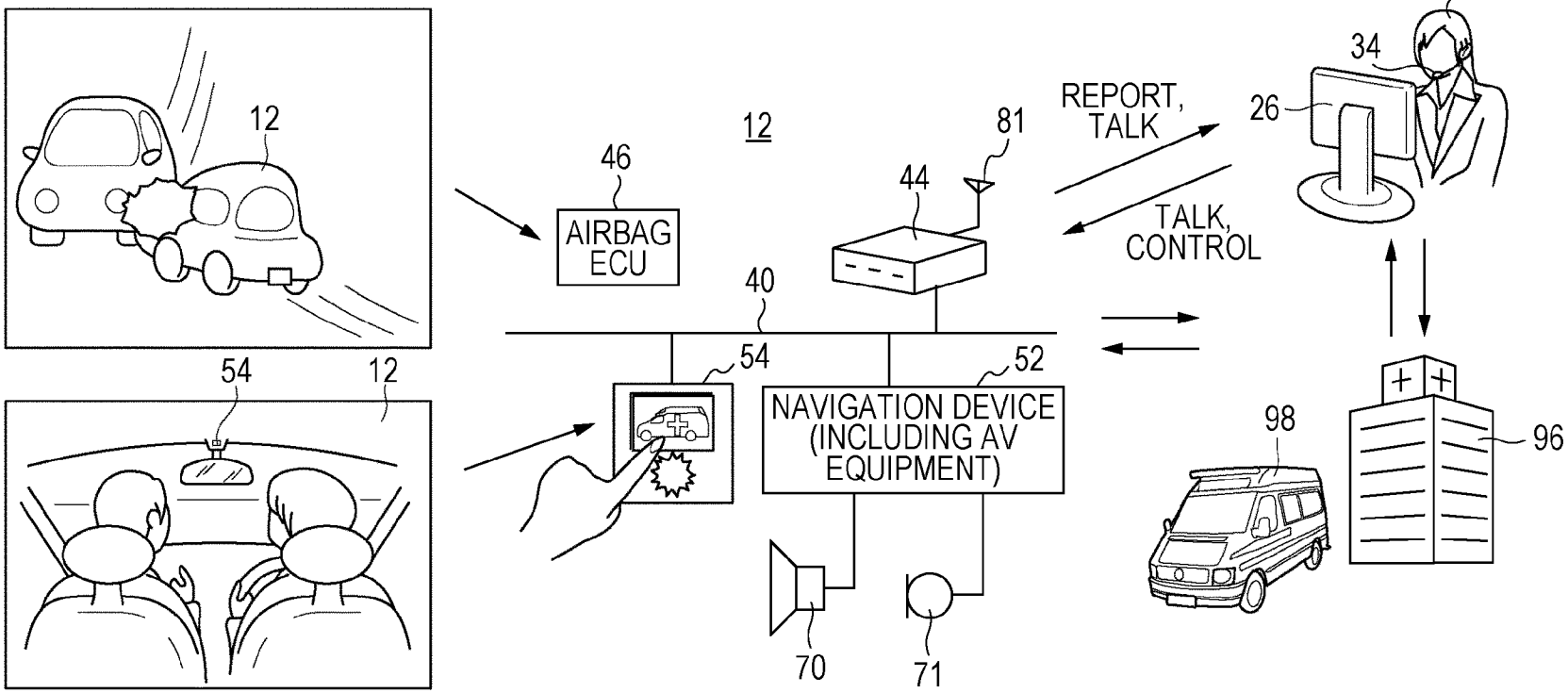
FIG. 6 illustrates emergency reporting in emergency mode.

In practice, as illustrated in FIG. 6, if the emergency switch 54 is pressed and the emergency-mode determining unit 92 determines that the vehicle 12 is in emergency mode, the navigation power controller 94 (see FIG. 2) turns on the navigation device 52 to activate the speaker 70 and the microphone 71. At the same time, the handsfree device 80 is activated so that the operator 28 of the call center device 26 can talk to an occupant of the vehicle 12.

In this case, the occupant in the vehicle 12 explains to the operator 28 about the situation through the handsfree device 80 and asks the operator 28 to arrange, for example, an emergency vehicle 98. In response to this, the operator 28 requests an emergency center 96 to dispatch the emergency vehicle 98. A so-called three-way call among the operator 28, the occupant in the vehicle 12, and an occupant in the emergency vehicle 98 is possible here.

Even if no occupant in the vehicle 12 responds to questions from the operator 28, the location information of the vehicle 12 can be transmitted from the activated navigation device 52 through the on-vehicle communication unit 44 and the server 24 to the call center device 26. Additionally, for example, a notification indicating that the emergency-mode determining unit 92 has received the collision detection signal Scd can be transmitted through the server 24 to the call center device 26. Therefore, the operator 28 can arrange the emergency vehicle 98 by contacting the emergency center 96 to report that the airbag of the airbag device 60 in the vehicle 12 has already been inflated and no response has been received from any occupant in the vehicle 12. In this case, when an occupant of the emergency vehicle 98 which has arrived at the location of the vehicle 12 (site) contacts the operator 28 by phone or the like, the operator 28 can unlock the door lock 62 of the vehicle 12 through the server 24 by remote control.

GENERAL DESCRIPTION OF EMBODIMENTS

According to the embodiments described above, the receiving unit 91 in the remote control ECU 10 of the on-vehicle communication unit 44 receives the remote-control request signal Srr transmitted from outside the vehicle 12 having the on-vehicle device 67 which is remotely controllable.

When the receiving unit 91 receives the remote-control request signal Srr, the remote-control executing unit 84 executes remote control of the on-vehicle device 67 in accordance with a request represented by the remote-control request signal Srr.

The use-state determining unit 90 determines whether the vehicle 12 is in use.

The remote-control-execution determining unit 86 determines whether to permit the remote-control executing unit 84 to execute remote control of the on-vehicle device 67.

If the use-state determining unit 90 determines that the vehicle 12 is in use, the remote-control-execution determining unit 86 does not permit the remote-control executing unit 84 to execute remote control of the on-vehicle device 67. Even when the vehicle 12 is determined to be in use, if the emergency-mode determining unit 92 determines that the vehicle 12 is in emergency mode, the remote-control-execution determining unit 86 permits the remote-control executing unit 84 to execute remote control of the on-vehicle device 67.

As described above, even when the vehicle 12 is determined to be in use (e.g., moving), if the emergency-mode determining unit 92 determines that the vehicle 12 is in emergency mode, the remote-control executing unit 84 is permitted to execute remote control. It is thus possible to execute remote control of the on-vehicle device 67 in case of emergency etc.

As described above, the vehicle 12 includes the collision sensor 58 that detects a collision of the vehicle 12 and outputs the collision detection signal Scd, and the emergency switch 54 that outputs the emergency detection signal Sed when operated. Therefore, when the collision detection signal Scd or the emergency detection signal Sed is input, the emergency-mode determining unit 92 can determine that the vehicle 12 is in emergency mode.

The use-state determining unit 90 may be configured to determine that the vehicle 12 is in use when the accessories of the vehicle 12 are on (i.e., the knob 72 of the knob-type ignition switch 56 is at the ACC position) or when the ignition of the vehicle 12 is on (i.e., the knob 72 of the knob-type ignition switch 56 is at the ON position).

Examples of operations of the on-vehicle device 67 that can be remotely controlled in emergency mode include locking and unlocking of the door lock 62, blinking of the lamp 66 which is a lighting unit (including lighting devices and turn signals), and providing signals and notifications through the horn 64 and the speaker 70. Opening and closing of windows enabled by a power window function (not shown) is also included in the embodiment of the present invention.

Thus, in rescue operations performed in response to emergency report, it is possible to externally unlock the door lock 62 or perform the car finder function.

According to the embodiments described above, even in the cases where the vehicle 12 is determined to be in use and execution of remote control of the on-vehicle device 67 is not normally permitted, if the vehicle 12 is determined to be in emergency mode, remote control of the on-vehicle device 67 can be permitted and executed. It is thus possible to execute remote control of the on-vehicle device 67 in the cases where remote control is necessary.

Obviously, the present invention is not limited to the embodiments described above, but may be configured variously in accordance with the description of the embodiments of the present invention.

According to the embodiment of the present invention, even when the vehicle is determined to be in use, if the emergency-mode determining unit determines that the vehicle is in emergency mode, the remote-control executing unit is permitted to execute remote control. It is thus possible to execute remote control of the on-vehicle device in case of emergency etc.

The on-vehicle remote control device may further include a collision sensor configured to detect a collision of the vehicle and output a collision detection signal, and an emergency switch configured to output an emergency detection signal when operated. Thus, the emergency-mode determining unit can determine that the vehicle is in emergency mode when the collision detection signal or the emergency detection signal has been input.

The use-state determining unit may determine that the vehicle is in use when accessories are on or an ignition is on.

The on-vehicle device that can be remotely controlled in case of emergency may be a door lock, a lighting unit (including lighting devices and turn signals), or a sound generator (including a horn and a speaker). Thus, in rescue operations performed in response to emergency report, it is possible to externally unlock the door lock or perform a car finder function.

As described above, even in the cases where the vehicle is determined to be in use and execution of remote control of the on-vehicle device is not normally permitted, if the vehicle is determined to be in emergency mode, remote control of the on-vehicle device can be permitted and executed. It is thus possible to execute remote control of the on-vehicle device in the cases where remote control is necessary.

Obviously, numerous modifications and variations of the present invention are possible in light of the above teachings. It is therefore to be understood that within the scope of the appended claims, the invention may be practiced otherwise than as specifically described herein.

What is claimed is:

[1. A method for controlling a remotely controllable on-vehicle device, comprising:

receiving a remote-control request signal transmitted from outside a vehicle having the on-vehicle device;

executing remote control of the on-vehicle device when the remote-control request signal is received;

prohibiting the remote control of the on-vehicle device if it is determined that the vehicle is in use and if it is determined that the vehicle is not in the emergency mode, wherein it is determined that the vehicle is not in the emergency mode if neither a collision detection signal nor an emergency detection signal has been input;

permitting the remote control of the on-vehicle device if it is determined that the vehicle is in the emergency mode even when it is determined that the vehicle is in use, wherein it is determined that the vehicle is in the emergency mode if the collision detection signal or the emergency detection signal has been input; and activating a communication device if it is determined that the vehicle is in the emergency mode so that an operator in a call center device can talk to an occupant of the vehicle via the communication device.]

[2. An on-vehicle remote control apparatus comprising:

receiving means for receiving a remote-control request signal transmitted from outside a vehicle having a remotely controllable on-vehicle device;

remote-control executing means for executing remote control of the on-vehicle device when the receiving means receives the remote-control request signal;

use-state determining means for determining whether the vehicle is in use;

emergency-mode determining means for determining whether the vehicle is in an emergency mode;

remote-control-execution determining means for determining whether the remote-control executing means is permitted to execute the remote control of the on-vehicle device; and a communication device, wherein the emergency-mode determining means is configured to determine that the vehicle is in the emergency mode if a collision detection signal or an emergency detection signal has been input, wherein the emergency-mode determining means is configured to determine that the vehicle is not in the emergency mode if neither the collision detection signal nor the emergency detection signal has been input, wherein, if the use-state determining means determines that the vehicle is in use and if the emergency-mode determining means determines that the vehicle is not in the emergency mode, the remote-control-execution determining means prohibits the remote-control executing means from executing the remote control of the on-vehicle device, wherein even when the use-state determining means determines that the vehicle is in use, if the emergency-mode determining means determines that the vehicle is in the emergency mode, the remote-control-execution determining means permits the remote-control executing means to execute the remote control of the on-vehicle device, and wherein, in the emergency mode, the communication device is activated so that an operator in a call center device can talk to an occupant of the vehicle via the communication device.]

[3. An on-vehicle remote control apparatus comprising:

a receiver to receive a remote-control request signal transmitted from outside a vehicle having a remotely controllable on-vehicle device;

a remote-control executing device configured to execute remote control of the on-vehicle device when the receiver receives the remote-control request signal;

a use-state determining device configured to determine whether the vehicle is in use;

an emergency-mode determining device configured to determine whether the vehicle is in an emergency mode;

a remote-control-execution determining device configured to determine whether the remote-control executing device is permitted to execute the remote control of the on-vehicle device; and a communication device, wherein the emergency-mode determining device is configured to determine that the vehicle is in the emergency mode if a collision detection signal or an emergency detection signal has been input, wherein the emergency-mode determining device is configured to determine that the vehicle is not in the emergency mode if neither the collision detection signal nor the emergency detection signal has been input, wherein, if the use-state determining device determines that the vehicle is in use and if the emergency-mode determining device determines that the vehicle is not in the emergency mode, the remote-control-execution determining device prohibits the remote-control executing device from executing the remote control of the on-vehicle device, wherein even when the use-state determining device determines that the vehicle is in use, if the emergency-mode determining device determines that the vehicle is in the emergency mode, the remote-control-execution determining device permits the remote-control executing device to execute the remote control of the on-vehicle device, and wherein, in the emergency mode, the communication device is activated so that an operator in a call center device can talk to an occupant of the vehicle via the communication device.]

[4. The on-vehicle remote control apparatus according to claim 3, further comprising:

a collision sensor configured to detect a collision of the vehicle and configured to output a collision detection signal; and an emergency switch configured to output an emergency detection signal when the emergency switch is operated, wherein the emergency-mode determining device is configured to determine that the vehicle is in the emergency mode when the collision detection signal or the emergency detection signal has been input to the emergency-mode determining device.]

[5. The on-vehicle remote control apparatus according to claim 3, wherein the use-state determining device is configured to determine that the vehicle is in use when accessories are on or an ignition is on.]

[6. The on-vehicle remote control apparatus according to claim 3, wherein the on-vehicle device comprises a door lock, a lighting device, or a sound generator.]

[7. The on-vehicle remote control apparatus according to claim 4, wherein the use-state determining device is configured to determine that the vehicle is in use when accessories are on or an ignition is on.]

[8. The on-vehicle remote control apparatus according to claim 4, wherein the on-vehicle device comprises a door lock, a lighting device, or a sound generator.]

[9. The on-vehicle remote control apparatus according to claim 5, wherein the on-vehicle device comprises a door lock, a lighting device, or a sound generator.]

[10. The on-vehicle remote control apparatus according to claim 7, wherein the on-vehicle device comprises a door lock, a lighting device, or a sound generator.]

*11. A method for controlling a remotely controllable on-vehicle device, comprising:*

*an on-vehicle remote control electronic control unit receiving a remote-control request signal from a user or a call center transmitted from outside a vehicle having the remotely controllable on-vehicle device;*

*the on-vehicle remote control electronic control unit receiving a first signal related to whether the vehicle is in use;*

*the on-vehicle remote control electronic control unit receiving a second signal different from the first signal and related to whether the vehicle is in an emergency mode, wherein the second signal is a collision detection signal or an emergency detection signal;*

*the on-vehicle remote control electronic control unit determining whether remote control of the remotely controllable on-vehicle device according to the received remote-control request signal is permissible when the remote control request signal is received, wherein said determining includes determining whether the vehicle is in use and whether the vehicle is in an emergency mode, wherein it is determined that the remote control of the remotely controllable on-vehicle device is not permissible if the first signal indicates the vehicle is in use and there is no second signal indicating the vehicle is in the emergency mode, and wherein it is determined that the remote control of the remotely controllable on-vehicle device is permissible if there is no first signal indicating the vehicle is in use or the second signal indicates the vehicle is in the emergency mode even when the first signal indicates the vehicle is in use;*

*the on-vehicle remote control electronic control unit activating a communication device if the second signal indicates the vehicle is in the emergency mode, the communication device allowing an operator in a call center to talk to an occupant of the vehicle via the communication device;*

*the on-vehicle remote control electronic control unit executing the remote control of the remotely controllable on-vehicle device according to the received remote-control request signal only if said determining*

*step determined that the remote control of the remotely controllable on-vehicle device is permissible; and*

*notifying the user or the call center outside the vehicle that the remote control of the remotely controllable on-vehicle device has been executed.*

*12. An on-vehicle remote control apparatus comprising:*

*receiving means for receiving a remote-control request signal from a user or a call center transmitted from outside a vehicle having a remotely controllable on-vehicle device, a first signal related to whether the vehicle is in use, and a second signal different from the first signal and related to whether the vehicle is in an emergency mode, wherein the second signal is a collision detection signal or an emergency detection signal;*

*use-state determining means for determining whether the vehicle is in use based on the first signal;*

*emergency-mode determining means for determining whether the vehicle is in an emergency mode based on the second signal;*

*remote-control-execution determining means for determining whether remote control of the remotely controllable on-vehicle device according to the received remote-control request signal is permissible when the remote control request signal is received, wherein the remote-control-execution determining means determines that the remote control of the remotely controllable on-vehicle device is not permissible if the use-state determining means determines that the vehicle is in use and if the emergency-mode determining means determines that the vehicle is not in the emergency mode, and wherein the remote-control-execution determining means determines that the remote control of the remotely controllable on-vehicle device is permissible if the use-state determining means determines that the vehicle is not in use or, even when the use-state determining means determines that the vehicle is in use, if the emergency-mode determining means determines that the vehicle is in the emergency mode;*

*a communication means that allows an operator in a call center to talk to an occupant of the vehicle via the communication means when the emergency-mode determining means determines that the vehicle is in the emergency mode; and*

*remote-control executing means for executing the remote control of the remotely controllable on-vehicle device according to the received remote-control request signal only if the remote-control-execution determining means determined that the remote control of the remotely controllable on-vehicle device is permissible; and*

*a state notification means configured to notify the user or the call center outside the vehicle that the remote control of the remotely controllable on-vehicle device has been executed.*

*13. An on-vehicle remote control apparatus comprising:*

*a receiver to receive a remote-control request signal from a user or a call center transmitted from outside a vehicle having a remotely controllable on-vehicle device, a first signal related to whether the vehicle is in use, and a second signal different from the first signal and related to whether the vehicle is in an emergency mode, wherein the second signal is a collision detection signal or an emergency detection signal;*

*a use-state determining device configured to determine whether the vehicle is in use based on the first signal;*

*an emergency-mode determining device configured to determine whether the vehicle is in an emergency mode based on the second signal;*

*a remote-control-execution determining device configured to determine whether remote control of the remotely controllable on-vehicle device according to the received remote-control request signal is permissible when the remote control request signal is received, wherein the remote-control-execution determining device determines that the remote control of the remotely controllable on-vehicle device is not permissible if the use-state determining device determines that the vehicle is in use and if the emergency-mode determining device determines that the vehicle is not in the emergency mode, and wherein the remote-control-execution determining device determines that the remote control of the remotely controllable on-vehicle device is permissible if the use-state determining device determines that the vehicle is not in use or, even when the use-state determining device determines that the vehicle is in use, if the emergency-mode determining device determines that the vehicle is in the emergency mode;*

*a communication device that allows an operator in a call center to talk to an occupant of the vehicle via the communication device when the emergency-mode determining device determines that the vehicle is in the emergency mode; and*

*a remote-control executing device configured to execute the remote control of the remotely controllable on-vehicle device according to the received remote-control request signal only if the remote-control execution determining device determined that the remote control of the remotely controllable on-vehicle device is permissible; and*

*a state notification device configured to notify the user or the call center outside the vehicle that the remote control of the remotely controllable on-vehicle device has been executed.*

*14. The on-vehicle remote control apparatus according to claim 13, further comprising:*

*a collision sensor configured to detect a collision of the vehicle and configured to output a collision detection signal as the second signal; and*

*an emergency switch configured to output an emergency detection signal as the second signal when the emergency switch is operated,*

*wherein the emergency-mode determining device determines the vehicle is in the emergency mode when the second signal, either as the collision detection signal or the emergency detection signal, has been input to the emergency-mode determining device.*

*15. The on-vehicle remote control apparatus according to claim 13,*

*wherein the use-state determining device determines the vehicle is in use when the first signal indicates that accessories are on or an ignition is on.*

*16. The on-vehicle remote control apparatus according to claim 13,*

*wherein the remotely controllable on-vehicle device comprises a door lock, a lighting device, or a sound generator.*

*17. The on-vehicle remote control apparatus according to claim 14,*

*wherein the use-state determining device determines the vehicle is in use when the first signal indicates that accessories are on or an ignition is on.*

*18. The on-vehicle remote control apparatus according to claim 14,*

*wherein the remotely controllable on-vehicle device comprises a door lock, a lighting device, or a sound generator.*

*19. The on-vehicle remote control apparatus according to claim 15,*

*wherein the remotely controllable on-vehicle device comprises a door lock, a lighting device, or a sound generator.*

*20. The on-vehicle remote control apparatus according to claim 17,*

*wherein the remotely controllable on-vehicle device comprises a door lock, a lighting device, or a sound generator.*

*21. The method according to claim 11,*

*wherein the second signal as a collision detection signal is output from a collision sensor, and wherein the second signal as an emergency detection signal is output from an emergency switch when the emergency switch is operated.*

*22. The method according to claim 11,*

*wherein the first signal indicates the vehicle is in use by indicating that accessories are on or an ignition is on.*

*23. The method according to claim 11,*

*wherein the remotely controllable on-vehicle device comprises a door lock, a lighting device, or a sound generator.*

*24. The method according to claim 21,*

*wherein the first signal indicates the vehicle is in use by indicating that accessories are on or an ignition is on.*

*25. The method according to claim 21,*

*wherein the remotely controllable on-vehicle device comprises a door lock, a lighting device, or a sound generator.*

*26. The method according to claim 22,*

*wherein the remotely controllable on-vehicle device comprises a door lock, a lighting device, or a sound generator.*

*27. The method according to claim 24,*

*wherein the remotely controllable on-vehicle device comprises a door lock, a lighting device, or a sound generator.*

* * * * *